J. J. Wise,
Hay Press,
No. 1,152.    Patented May 16, 1839.
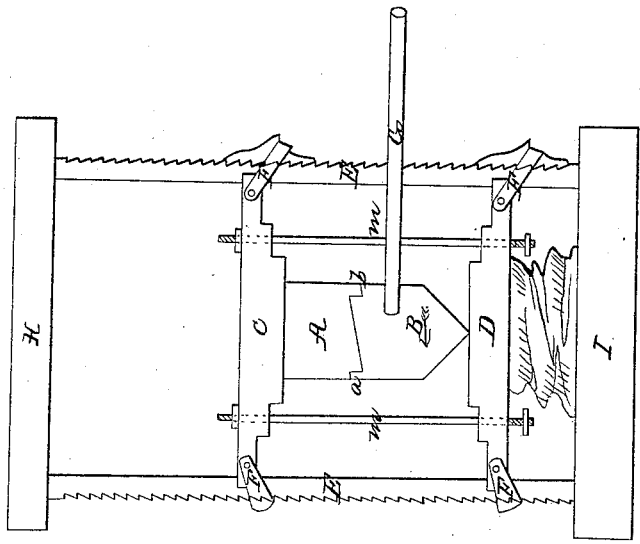
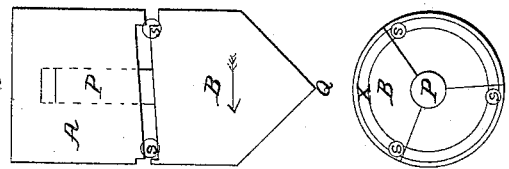
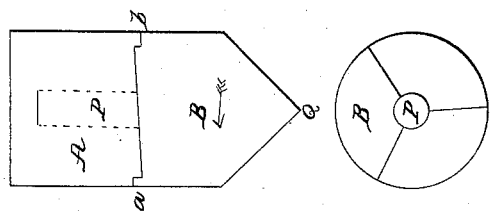

UNITED STATES PATENT OFFICE.

JOHN J. WISE, OF BALTIMORE, MARYLAND.

IMPROVEMENT IN THE CONSTRUCTION OF PRESSES.

Specification forming part of Letters Patent No. 1,152, dated May 16, 1839.

*To all whom it may concern:*

Be it known that I, JOHN J. WISE, of the city of Baltimore, in the State of Maryland, have invented a new and useful Improvement in the Construction of Presses; and I do hereby declare that the following is a full, clear, and exact description of the improvement made by me.

The screw has been the principal of the contrivances heretofore used to obtain great pressure, and so far as the action of the screw is the result of mechanical power of the inclined plane so far the machine that I have invented has a principle in common with the screw. The effect of the screw is produced by one inclined plane pressing and sliding upon another, one plane being on the male and the other in the female screw, and the effect of the machine invented by me is produced by one inclined plane pressing and sliding upon another; but the form of construction is wholly different. It is the form that I have invented, and it is for the form that I seek a patent.

The machine invented by me consists in the active part of it of two separate cylindrical blocks or pieces of brass, iron, or other metal. (Represented in the accompanying drawings, which are a part of this specification, by A and B.) These pieces fit together at the line between *a* and *b*. The surface of contact, instead of being flat and smooth between the upper and lower block, A and B, is divided into three inclined surfaces, each of which has the surface that would belong to the upper surface of the thread of a screw of the same external angle and diameter if continued to the axis of motion, or, having reference to the mandrel hereinafter described, the surfaces would be the surfaces of the threads of a screw whose threads were as deep as the distance from the outer diameter of the block to the mandrel. The "blocks," as I term them, A and B, are kept, one, exactly, at all times over the other by a round mandrel or gudgeon, P, fastened to the lower block and moving freely in a hole made to receive it in the upper block. Now, it will be seen at once that if the upper block, A, is held fast and B is turned in the direction of the arrow, that the three inclined planes of the upper block, pressed upon by the corresponding planes of the lower block, will force the lower block down and produce pressure upon anything placed under the point Q.

Now, so far as this goes, this is the way the power of a common screw is obtained; but the inventor of the screw could not have done it without the principle contained in the inclined plane. He took that principle and put it into the machine called the "screw." I take the same principle and put it into a machine differing in form from the screw, and presenting advantages which make the new form of applying the power of the inclined plane a new and useful improvement. I make this statement to show that I am not patenting the screw, (which is one form of applying the power of the inclined plane,) but another and new form of application of the inclined plane.

The form of the screw is so well known that it is almost useless to remind any one that in one turn of the screw, where one thread is used, the point of the press must descend a distance equal to the width of the thread and the width of the groove, where three threads are used, the width of three threads and three grooves, and in some printing-presses this is two inches in a screw three inches in diameter.

Now, in the machine invented by me I dispense with the male and female screws in ordinary use and employ two blocks, as aforesaid, with their three corresponding inclined planes. These inclined planes may have as small an angle as can be used or required, and by increasing the diameter of the blocks the surface of contact on the inclined planes is increased and the machine strengthened, instead of being weakened. The mode of increasing the power of a screw by diminishing the angle of the inclined plane is to increase the diameter of the screw and to make the thread finer. In my invention a much simpler contrivance answers the purpose.

In some cases, where the pressure required is in a small limit, as in a printing-press or press for coining, the machine above described will be found to answer the purpose. In the printing-press, for instance, the substitution of the machine, Figs. 1 and 2, in place of the common screw of the press, will answer the purpose, a lever being put to the lower block, as represented in Fig. 3, and the platen being under the lower block. The motion of the lower block one-third round at each pull will depress the platen on the type, and the retrograde motion for the same distance will raise the platen to let the type pass from underneath. So in coining, the alternate motion of the lever backward and forward will make the impression and then free the coin from the dies; but where there is a continuous press required, as in the pressing of tobacco, and in the standing press of printers and engravers, inasmuch as the machine invented by me can only be pulled a part of the way round, an additional contrivance has to be made to hold what is gained by each pull until the machine can be brought again into effective action. For this purpose I construct a standing press, as represented in Fig. 3. The upper block, A, is fastened to a head-piece, C, which extends on either side to the uprights E E, which serve also to unite the top and bottom of the press, and the point of the block B rests on the foot-piece D, under which is placed whatever is required to be pressed. To each end of the head and foot pieces are strong clicks F F, which fall into the teeth of the ratchets on E E, and which teeth are the distance apart which the lower block of the machine B descends at each pull upon it. We suppose now the clicks of the head-piece C to be in the teeth of the ratchet and a pull to be taken on the lower block, B, by the lever G. It descends, of course, until the clicks on the foot-piece D fall into the ratchets, which hold down the foot-piece until the lower block, B, is turned back, when the weight of the upper one brings it down until the clicks on the head-piece catch again on the ratchet and the head-piece is held fast. Another pull is given to the lower block, the foot-piece descends until the clicks on it catch, the lower block is then turned back, the head-piece comes down again, and so on.

In pressing tobacco with a common screw, a lever some ten or twelve feet long and of great weight is used. This is worked by six or eight or more men, who, having made a half-turn, take the lever from one hole in the head of the screw and put it into another, thus losing both time and labor, while in the machine invented by me the labor would be limited to moving backward and forward through one-third of a circle without taking the lever from its permanent position.

The drawings represent two different kinds of clicks in Fig. 3, either of which will answer, as will many others, all that is necessary in this part of the machine being to guard against springing or yielding.

Another invention connected with the machine in question is the use of the friction-rollers represented at S S S in Fig. 2. These are of iron, steel, or brass, and are perfect spheres, which roll in small grooves sufficiently deep to guide them out on the face of each of the inclined planes, as shown in Fig. 2. The use of friction-rollers is well known; but I am not aware that they have ever been employed as here described to facilitate the action of the inclined plane when used in connection with the screw or any similar contrivances.

The drawings represent three inclined planes. I have used two. Four or five may be used. Three I have found to answer well.

What I claim as my invention, and desire to secure by Letters Patent, is—

1. The manner in which I construct the blocks A and B, and connect them with the other parts of the press either with or without friction rollers or balls between the parts which I have denominated inclined planes, as hereinbefore described.

2. The manner of combining the vibrating block with the head-piece C, the foot-piece D, and the uprights E E, so as to co-operate with each other, substantially as above set forth, not intending by this claim to limit myself to the precise arrangement herein shown, but to vary the same as I may think proper, while the principle of action remains unchanged.

JOHN J. WISE.

Witnesses:
 JAS. B. LATIMER,
 JAMES S. WHITE.